United States Patent [19]

Leuz

[11] Patent Number: 4,901,509
[45] Date of Patent: Feb. 20, 1990

[54] MULCHING ATTACHMENT FOR LAWN MOWER

[76] Inventor: Frederick E. Leuz, R.D. 1, Box 626, Pipersville, Pa. 18947

[21] Appl. No.: 221,508

[22] Filed: Jul. 19, 1988

[51] Int. Cl.$^4$ ............................................. A01D 34/63
[52] U.S. Cl. ........................................................ 56/16.9
[58] Field of Search ................ 56/295, 255, 16.9, 503

[56] References Cited

U.S. PATENT DOCUMENTS

| | | | |
|---|---|---|---|
| 2,669,084 | 2/1954 | Warren | 56/295 |
| 2,908,128 | 10/1959 | Mauro | 56/295 |
| 3,050,924 | 8/1962 | West | 56/295 |
| 3,080,697 | 3/1963 | Mauro | 56/295 |
| 3,093,952 | 6/1963 | Bonser | 56/295 |
| 3,100,371 | 8/1963 | Redmon | 56/255 |
| 3,103,093 | 9/1963 | House, Jr. | 56/295 |
| 3,183,655 | 5/1965 | Dunlap et al. | 56/295 |
| 3,398,514 | 8/1968 | Nolan | 56/16.9 |
| 3,703,071 | 11/1972 | Anderson | 56/503 |
| 3,716,090 | 2/1973 | Lautzenheiser | 56/12.8 |
| 3,808,782 | 5/1974 | McWilliams | 56/16.9 |
| 4,057,952 | 11/1977 | Brokaw | 56/16.9 |
| 4,796,416 | 1/1989 | Bandig et al. | 56/13.4 |

Primary Examiner—Paul J. Hirsch
Attorney, Agent, or Firm—Gregory J. Gore

[57] ABSTRACT

A vertical, substantially funnel-shaped feed chute attaches to the top of the mower deck of a rotary lawn mower. The bottom opening of the feed chute corresponds with an aperture in the mower deck. The rotary mower is further adapted by reversing a double-edged cutting blade to reverse the air flow characteristics from upward to downward. Garden debris for mulching is inserted into the mouth of the feed chute and is drawn into contact with the cutting blades by gravity and by the movement of air drawn down through the feed chute by the aerodynamic wing on the cutting blade.

4 Claims, 1 Drawing Sheet

MULCHING ATTACHMENT FOR LAWN MOWER

FIELD OF THE INVENTION

This invention relates generally to home gardening equipment. More specifically, it relates to attachments for converting an ordinary rotary lawn mower into a mulching machine for cutting twigs, branches and leaves into fine cuttings.

BACKGROUND AND PRIOR ART

The home gardening art has long appreciated the need for adapting rotary lawn mowers to finely mulch grass cuttings in order to remove the need for raking, subsequent to the grass cutting operation. This need has been met with many different rotary mower attachments, such as those disclosed in the following patents: U.S. Pat. No. 4,318,268 to Szymanis; U.S. Pat. No. 4,083,166 to Haas; U.S. Pat. No. 4,435,949 to Heismann; U.S. Pat. No. 4,205,512 to Thorud; U.S. Pat. No. 4,189,903 to Jackson et al; U.S. Pat. No. 4,135,351 to Akgulian; U.S. Pat. No. 4,292,791 to Lalonde.

These patents describe various blade and mower housing structures which re-circulate or re-cut the grass in order to provide a finer discharge of the cut material. None, however, discloses or suggests an attachment by which articles other than those which pass underneath the mower may be fed independently into the mower for mulching. Furthermore, there is no suggestion in any of the prior patents that any adaptors or other mower modifications could be suitable for mulching sticks, twigs, leaves and other garden debris.

Adaptors for feeding materials into the top of the mower deck, such as that disclosed in U.S. Pat. No. 3,100,371 to P. C. Redmon for dispensing lawn seed, are known. The Redmon dispenser includes an internal rotary disk operated by a mower wheel roller to dispense fertilizer and seeds for preparing or treating lawns. However, the Redmon disclosure neither teaches nor suggests a mower attachment suitable for general garden mulching. None of the prior art teaches or suggests an adaptor for a rotary lawn mower which efficiently converts it to a mulching device for creating general garden mulch out of usual gardening debris, nor do they suggest a safe manner in which the plant debris may be safely and efficiently hand-fed into the mower assembly for mulching.

SUMMARY OF THE INVENTION

In order to satisfy the need for an inexpensive and efficient garden mulcher, the present equipment has been devised which easily adapts to any standard rotary lawn mower. The invention consists primarily of two parts. A vertical, funnel-shaped feed chute which attaches to the top of the mower deck, and a change to the cutting blade in order to reverse the air flow characteristics of the blade. The feed chute is mounted directly on the mower deck and is aligned with a cooperating aperture formed therein. The feed chute may later be removed and replaced by a coverplate over the deck aperture so that the mower may once again be returned to normal use. Furthermore, a double-edge cutting blade has been devised so that it may be easily converted to the mulching mode merely by reverse mounting the blade on the motor shaft.

It is therefore an object of the present invention to devise an inexpensive and efficient device for converting a standard rotary lawn mower into a garden mulcher. It is an additional object of the present invention to provide conversion equipment for a standard rotary lawn mower that will provide for the safe and efficient mulching of discarded plant materials, such as twigs, leaves and branches.

Other objects and advantages will be obvious to those skilled in the art from the foregoing drawings and description.

DESCRIPTION OF THE PREFERRED EMBODIMENT

Figure 1:
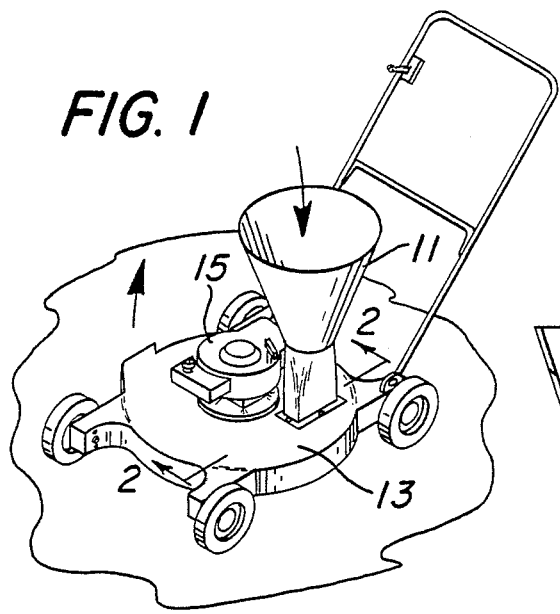
FIG. 1 is an isometric view of the present invention.

Referring now to FIG. 1, the feed chute assembly 11 is attached to a standard lawn mower 15 and is affixed directly to the top of the deck 13 of the mower. The feed chute is affixed to the mower deck by rivets, sheet metal screws, or other suitable fasteners. The feed chute has a vertical orientation and provides gravity feed for materials introduced into the mouth of the chute. The feed chute attaches to the mower deck at a point directly above the sharpened end region of the cutting blade.

Figure 2:
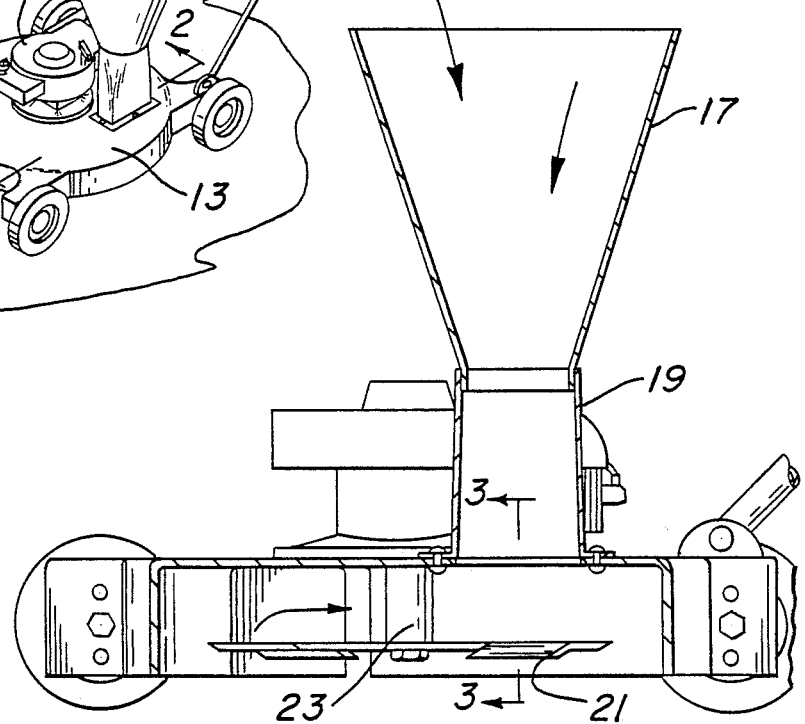
FIG. 2 is a cross-section taken from FIG. 1 showing the relation between the feed chute and the mower deck.

Referring now to FIG. 2, the feed chute includes two portions; a top conical funnel portion 17 which mates with a second bottom portion 19 which has a rectangular cross-section. The convergent sides of the funnel portion 17 act to compress and compact material introduced to the top of the funnel. As shown in FIG. 2, the feed chute is located directly above the sharpened end portion of the cutting blade 21 which is mounted upon motor shaft 23 in the usual manner. The feed chute is approximately 24 inches long, which is tall enough to keep the hands of the user at a safe distance from the cutting blade and, hence, materials for mulching may be safely hand-fed into the feed chute.

Figure 4:
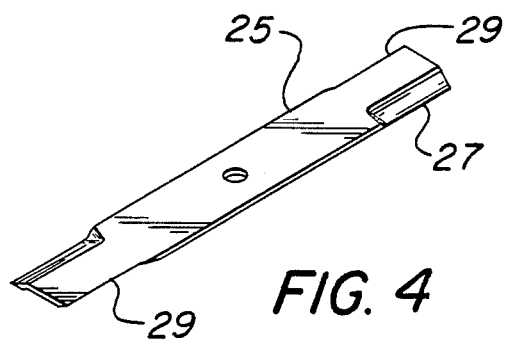
FIG. 4 is an isometric view of the cutting blade of the present invention.

Referring now to FIG. 4, the present invention includes a novel cutting blade 25 which has cutting surfaces sharpened on both sides. Otherwise, the blade is similar to a standard rotary lawn mower cutting blade which includes the angled wing 27 for creating an uplift of air during mowing. When used in the mulching mode, however, the blade is inverted and the wing 27 causes air movement in the opposite or downward direction. Furthermore, the additional cutting surface on the back side of the blade 29 now becomes the leading edge as the blade rotates and it thus becomes the cutting edge for mulching.

Figure 3:
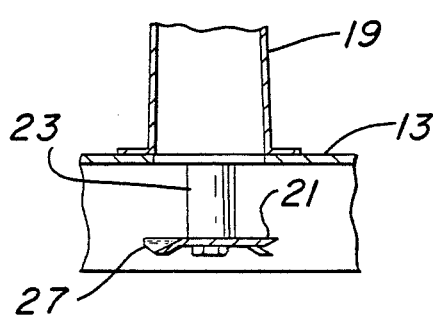
FIG. 3 is a sectional view taken from FIG. 1 showing the cutting angle of the blade in relation to the feed chute discharge.

As shown in FIG. 3, the cutting elements of the blade are directly below the point where the feed chute is attached to the top of the mower deck. The reversed aerodynamic wing on the blade acts to create a movement of air in the downward direction developing a suction which helps draw mulching debris downward into the feed chute and then into the cutting blade. Reversing the aerodynamic effect of the standard rotary cutting blade is essential for the operation of the invention because without the reversal, any material which is attempted to be introduced to the feed chute would be blown upward, rather than drawn downward.

As shown in the preferred embodiment, the invention is depicted as permanently converting a rotary lawn mower to garden mulcher. However, it should be readily understood to those of ordinary skill in the mechanical arts that the feed chute may be made removable from the mower deck and thereafter the feed chute aperture blocked by a coverplate (not shown) which may use the same mounting devices as the feed chute. Also, it will be understood that the novel, double-edge blade described above may easily be removed and returned to its normal position so that the aerodynamic wing and cutting edge are in their normal orientation. This convertibility permits the mulching mower to be converted to its lawn mowing mode conveniently with a minimum number of tools required for the change in use.

It should be understood that the above description discloses specific embodiments of the present invention and are for purposes of illustration only. There may be other modifications and changes obvious to those of ordinary skill in the art which fall within the scope of the present invention which should be limited only by the following claims and their legal equivalents.

What is claimed is:

1. A rotary mower converted for use as a garden mulcher, comprising:
   a. a housing having a substantially flat, horizontal deck portion;
   b. a motor mounted upon said deck, said motor having a motor shaft extending below said deck;
   c. a rotary cutting blade located beneath the deck affixed to said motor shaft;
   d. a funnel-shaped feed chute affixed to said deck, said feed chute being completely unobstructed and open to the path of the cutting blade;
   e. said cutting blade being reversible and having a single, aerodynamic wing portion positioned to create a down draft when oriented in the mulching mode, said blade further including a first cutting edge on the leading surface of said aerodynamic wing located directly beneath said feed chute, said blade further including a second cutting edge on its trailing side opposite said first cutting edge.

2. The lawn mower converted for mulching of claim 1 further described in that said feed chute is vertically oriented and includes two portions, a top convergent funnel-shaped portion and a second portion having a rectangular cross-section.

3. The mulching lawn mower of claim 2 further described in that said feed chute is releasably attached to said deck.

4. The method of converting a rotary lawn mower to a general garden mulcher, said lawn mower having a motor mounted to a housing having a deck portion with a rotary cutting blade located beneath said deck, comprising the steps of:
   a. inverting the position of a double-edged, single, winged cutting blade mounted on a motor shaft of said mower whereby, in operation, said blade creates a downdraft; and
   b. affixing a feed chute to the deck of said mower in alignment of an aperture in said mower deck, said aperture being located directly above said cutting blade.

* * * * *